US008954885B2

(12) United States Patent
Berman et al.

(10) Patent No.: US 8,954,885 B2
(45) Date of Patent: Feb. 10, 2015

(54) DISPLAY SYSTEM USING METADATA TO ADJUST AREA OF INTEREST AND METHOD

(75) Inventors: Arthur L. Berman, San Jose, CA (US); John D. Fergason, Cupertino, CA (US)

(73) Assignee: Fergason Patent Properties, LLC, Menlo Park, CA (US)

(*) Notice: Subject to any disclaimer, the term of this patent is extended or adjusted under 35 U.S.C. 154(b) by 619 days.

(21) Appl. No.: 12/898,110

(22) Filed: Oct. 5, 2010

(65) Prior Publication Data

US 2012/0081554 A1 Apr. 5, 2012

(51) Int. Cl.
| | | |
|---|---|---|
| G06F 3/048 | (2013.01) | |
| H04N 5/91 | (2006.01) | |
| H04N 5/93 | (2006.01) | |
| G06F 17/30 | (2006.01) | |
| H04N 9/82 | (2006.01) | |
| H04N 5/913 | (2006.01) | |

(52) U.S. Cl.
CPC ............ *H04N 5/91* (2013.01); *G06F 17/30038* (2013.01); *H04N 5/9305* (2013.01); *H04N 9/8205* (2013.01); *H04N 9/8227* (2013.01); *H04N 2005/91392* (2013.01)
USPC ............................ 715/802; 715/764; 715/821

(58) Field of Classification Search
CPC ................................................. G06F 17/30038
USPC .......................................... 715/764, 765, 817
See application file for complete search history.

(56) References Cited

U.S. PATENT DOCUMENTS

| | | | |
|---|---|---|---|
| 6,282,317 B1 | 8/2001 | Luo et al. | |
| 6,985,172 B1 | 1/2006 | Rigney et al. | |
| 7,053,953 B2 | 5/2006 | Belz et al. | |
| 7,188,316 B2 * | 3/2007 | Gusmorino et al. | .......... 715/764 |
| 7,809,210 B2 * | 10/2010 | Lou | ................................ 382/274 |
| 8,280,192 B2 * | 10/2012 | Lou | ................................ 382/298 |
| 2003/0033384 A1 | 2/2003 | Nishizawa et al. | |
| 2003/0118245 A1 | 6/2003 | Yaroslavsky et al. | |
| 2003/0146997 A1 | 8/2003 | Fredlund et al. | |
| 2004/0041813 A1 | 3/2004 | Kim | |
| 2005/0100242 A1 | 5/2005 | Trifonov et al. | |

(Continued)

FOREIGN PATENT DOCUMENTS

| | | |
|---|---|---|
| EP | 0 730 371 | 9/1996 |
| WO | WO 2008/095037 | 8/2008 |

OTHER PUBLICATIONS

Nalliah Raman et al., Content based contrast enhancement for liquid crystal displays with backlight modulation, 2005, IEEE Transactions on Consumer Electronics, 51 (1):18-21.

(Continued)

*Primary Examiner* — William Titcomb
(74) *Attorney, Agent, or Firm* — Vedder Price, P.C.

(57) ABSTRACT

A method of and apparatus for preparing an image signal includes combining with a video signal having a number of objects of interest metadata identifying the objects as Area of Interest (AOI). Exemplary objects includes an object in a group of objects, such as a horse in a horse race, a sports object, such as a hockey puck, and so on. The object may be an objectionable, such as a representation of violence, sex or vulgar language. A user may provide an input to select an object of interest to alter the prominence of the selected object. A display system responsive to the image signal for showing images having AOI with altered prominence based on user input. A non-transitory computer readable medium containing logic code for carrying out the foregoing.

13 Claims, 5 Drawing Sheets

(56) References Cited

U.S. PATENT DOCUMENTS

| | | | |
|---|---|---|---|
| 2005/0128312 A1 | 6/2005 | Fredlund et al. | |
| 2005/0134719 A1* | 6/2005 | Beck | 348/333.11 |
| 2005/0220348 A1 | 10/2005 | Chiu et al. | |
| 2006/0090141 A1* | 4/2006 | Loui et al. | 715/764 |
| 2006/0152619 A1 | 7/2006 | Takei | |
| 2006/0204054 A1 | 9/2006 | Steinberg et al. | |
| 2007/0027844 A1 | 2/2007 | Toub et al. | |
| 2007/0083815 A1* | 4/2007 | Delorme et al. | 715/723 |
| 2007/0136742 A1 | 6/2007 | Sparrell | |
| 2007/0183662 A1 | 8/2007 | Wang et al. | |
| 2007/0189627 A1 | 8/2007 | Cohen et al. | |
| 2007/0189713 A1 | 8/2007 | Choi et al. | |
| 2008/0034325 A1* | 2/2008 | Ording | 715/838 |
| 2008/0090610 A1 | 4/2008 | Wang et al. | |
| 2008/0137984 A1* | 6/2008 | Lou | 382/273 |
| 2008/0219529 A1 | 9/2008 | Alexandrov et al. | |
| 2008/0307337 A1* | 12/2008 | Marinkovich et al. | 715/764 |
| 2009/0002563 A1 | 1/2009 | Barnhoefer et al. | |
| 2009/0327894 A1* | 12/2009 | Rakib et al. | 715/719 |
| 2010/0086022 A1* | 4/2010 | Hunleth et al. | 375/240.01 |
| 2010/0241951 A1* | 9/2010 | Vandervort et al. | 715/239 |
| 2010/0253846 A1* | 10/2010 | Fergason et al. | 348/576 |
| 2011/0131605 A1* | 6/2011 | Pratt et al. | 725/39 |
| 2011/0242420 A1* | 10/2011 | Lou | 348/607 |

OTHER PUBLICATIONS

Fergason Patent Properties, System Synchronized Brightness Control (SSBC): Dramatically Improving LCD and Projection Images, 2006, Fergason Patent Properties . . . .

Nachyuck Chang et al., DLS: Dynamic Backlight Luminance Scaling of Liquid Crystal Display, 2004, IEEE Tranactions on Very Large Scale Integration (VLSI) Systems, 12(8):837-846.

Ki-Duk Kim et al., Adaptive Dynamic Image Control for IPS-Mode LCD TV, 2004, Socieity for Information Display Symposium Digest of Technical Papers, 35(1):1548-1549.

Ali Iranli et al., HEBS: Histogram Equalization for Backlight Scaling, 2005, Proceedings of the conference on Design, Automation and Test in Europe, p. 346-351.

Ali Iranli et al., HEBS: Histogram Equalization for Backlight Scaling (Presentation), 2005, Proceedings of the conference on Design, Automation and Test in Europe.

Eui Yeol Oh et al., IPS-Mode Dynamic LCD-TV Realization with Low Black Luminance and High Contast by Adaptive Dynamic Image Control Technology, 2005, Journal of the . . . .

Insun Hwang et al., Image Synchronized Brightness Control, 2001, Socieity for Information Display Symposioum Digest of Technical Papers, 32(1):492-493.

Hojun Shim et al., Power Saving in hand-held multimedia systems using MPEG-21 Digital Item Adaptation, 2004, Workshop on Embedded Systems for Real-Time Multimedia, p. 13-18.

Cassandra Swain at al., Defocus-Based Image Segmentation, 1995, International Conference on Acoustics, Speech and Signal Processing, vol. 4, p. 2403-2406.

ERDAS, ERDAS Imagine Tour Guide: ERDAS Imagine v8.4; 1999, ERDAS, Inc., Chapter 1.

ITC-ILWIS, ILWIS 3.0 Academic User's Guide, 2001, Unit Geo Software Development Sector Remote Sensing and GIS IT Department International Institute for Aerospace Survey . . . .

* cited by examiner

DISPLAY SYSTEM USING METADATA TO ADJUST AREA OF INTEREST AND METHOD

TECHNICAL FIELD

The present invention relates generally, as indicated, to display system using metadata to adjust area of interest and method, and to using metadata information representative of an area of interest of an image to adjust image information for display.

BACKGROUND

In the field of display technology an area of interest (AOI) is an area in an image that has particular interest for a given reason. An area of interest may be part (or all) of an image that it is desired to emphasize or to deemphasize. It has been a problem to identify or to tag an AOI in an image, e.g., to specify what part of an image is an AOI, and once identified it has been a problem to indicate what is to be done with the AOI, e.g., whether and how to emphasize or to deemphasize the AOI. This becomes even more difficult as images become represented by more and more data that has to be understood, decoded, processed, and so on within a relatively strict time allotment to provide a display signal to a display to show an image on the display.

Metadata has several different definitions, such as, for example, metadata is data about data, metadata is information about data, metadata is information about information, and so on.

An example of metadata and its use and value may be, for example, as follows: "1 2 3 4 5" is data which without additional context, is meaningless. With additional information being provided (metadata being such additional information) such as, this number is a "ZIP code", a person can understand that "1 2 3 4 5" refers to a particular address area used in the U.S. Postal System. Other more sophisticated definitions of metadata include metadata is optional, structured, and coded data that are publically available and that describe the characteristics of information bearing entities to aid in the identification, discovery, assessment and management of the described entities.

An example of using metadata is in the use of MPEG-7 standards. MPEG-7 is an ISO standard developed by the Moving Picture Experts Group. MPEG-7 can be considered the multimedia standard for the fixed and mobile web enabling integration of multiple paradigms. Another description of MPEG-7 is a standard for describing the multimedia content data that supports some degree of interpretation of the information meaning that can be passed to or accessed by a device or a computer code. Thus, MPEG-7 is an example of how metadata may be used in video technology.

Various types of display devices are used to show images for viewing and/or for projection such that the projected image ultimately may be viewed. Two exemplary displays include passive displays and light emitting displays. Examples of a passive display are liquid crystal displays, digital micromirror displays, and so on. Examples of light emitting displays are cathode ray tube displays (CRT), plasma displays, and so on. In a passive display a light modulating device, e.g., a liquid crystal device or digital micromirror device, modulates light from a light source to create bright and dark portions and color portions of an image; the respective portions are composed of pixels, and as is well known, a typical image formed on a liquid crystal display is made up of a collection of many pixels. Various types of light sources are available to illuminate the modulator of a passive display, such as, for example, fluorescent tubes, light emitting diodes (LED), and so on. In light emitting displays the pixels are formed by individual light emitting parts of the display itself, such as, for example, light emitting phosphors in a CRT.

Displays may be used to show various types of images, e.g., still images or moving images (sometimes referred to as motion pictures, movies and so on). A common type of image is a video image that is shown on a display, for example, on a television or monitor or via a projector. A video image may be a still picture or a moving picture, e.g., a motion picture or movie. In a motion picture a sequence of images is shown on the display, and each image may include a small difference from the preceding image so as to create the appearance of motion, such as, for example, a person walking, running, waving, and/or speaking, a ball moving a in sports game, an aircraft flying through the air, and so on.

There are various definitions of video and video images, which may change from time to time as technology changes; and there may be various other ways of showing images on displays that are different from what may be referred to as "video technology." In the interest of brevity all images referred to herein, whether still images or moving images or images that portray a motion type of action or occurrence will be referred to collectively as video image, video or simply as image, regardless of the actual type of image(s), technique for forming and/or showing the image(s) and so on.

Also, it will be appreciated that there are various sources of image signals that can be provided for use by display systems to cause the showing of one or more images on a display for direct viewing and/or for projection. Examples of sources of such image signals are those transmitted to a television via over-the-air broadcast transmission, cable connection, satellite, DVD (Digital Visio Disk), tape, compact disk, Blu-Ray, HD DVD (high definition digital video disk), a network, such as, for example, the internet or some other network, whether wide area, local area, or other type, and so on. The initial source of image signals, may be a television camera photographing, videotaping or the like of a scene for a movie; a personal digital camera, mobile phone or the like; a camera or other device that stores images drawn by cartoonists; a computer system that generates images, and so on. Other examples of initial sources of image signals also may exist or come into existence in the future.

An editor person may edit a video before the video is released, e.g., provided to a consumer who wishes to view a movie, to a movie theater for presentation to customers, and so on. The editor may select which scenes or portions of scenes should be included in the video and which should be discarded and/or may elect to highlight part of an image by zooming in on an object in the image, such as, for example, the face of a person, a ball in a game, and so on. The person who directs making of a movie, e.g., the director, also may be considered an editor in that such person may determine the composition of a scene, how actors should behave in the scene, etc. Another possibility is that the editor is a reviewer or reviewing board that makes decisions as to what is appropriate in a movie to show to persons of various ages, e.g., based on violence content, sex content and so on.

BRIEF SUMMARY

An aspect of the invention relates to a method of creating an image signal, including obtaining a primary video signal representing a sequence of images that include a plurality of objects of interest, preparing object identification signals to identify one or more of the plurality of the objects of interest, and combining the object identification signals as metadata with the primary video signal to form an image signal.

Other aspects associated with the immediately preceding aspect include one or more of the following:

Wherein the combining includes placing the metadata in the image signal to be decoded to identify one or more selected objects of interest as area of interest for showing via a display system.

Wherein the preparing object identifying signals includes respectively identifying objects amount a group of objects in respective images in the sequence of images.

Wherein the preparing object identification signals includes selecting objects based on shape, color, size, electromagnetic energy information, number or character.

Wherein the sequence of images is in the form of a data stream representing a plurality of images in the sequence image sequence, and the combining includes placing the metadata in one location in the data stream to impact the showing of a plurality of images by a single metadata.

Wherein the sequence of images is in the form of a data stream representing a plurality of images in the sequence image sequence, and the combining includes placing respective metadata in the data stream in relation to respective images represented in the data stream.

Wherein the objects of interest are individual objects in a group of objects.

Wherein each of a plurality of objects is a person in a group of persons.

Wherein each of a plurality of objects is an animal in a group of animals.

Wherein at least one of the objects is a sports object, such as a hockey puck, golf ball, tennis ball, baseball, shuttlecock, or the like.

Wherein at least one of the objects is a pornographic image.

Wherein the object of interest is an objectionable image due to sex, violence, language or the like.

Further including selecting the metadata to highlight one or more respective selected objects of interest in the course of showing images via a display based on a user selected input.

Another aspect relates to a method of displaying images, including receiving an image signal that includes a primary video signal representing a sequence of images that include a plurality of objects of interest and includes metadata identifying one or more of a plurality of objects of interest in respective images of the sequence of images, and supplying a selecting input to select one or more of the plurality of objects of interest based on the metadata identifying the selected one or more of the plurality of objects of interest.

Other aspects associated with the immediately preceding aspect include one or more of the following:

Further including decoding the metadata and the supplying a selecting input including selecting from the metadata the selected one or more of the plurality of objects of interest.

Wherein the supplying a selecting input includes supplying a user input.

Further including showing the images on a display with highlighting of the selected one or more of the plurality of objects of interest relative to other portions of respective images in the sequence of images.

Wherein the showing with highlighting including continuing to show with highlighting in respective images although the number of metadata parts of the image signal is not the same as the number of respective images in the sequence of images.

Wherein the selected one or more objects of interest is highlighted to change the prominence thereof relative to other portions of the displayed image.

Wherein changing prominence includes at least one of brightening, darkening, outlining, blurring, blacking out, or the like.

Another aspect relates to logic code stored in a non-transitory computer readable medium logic code to form an image signal, the logic code configured for use with a primary video signal representing a sequence of images that include a plurality of objects of interest and for use with object identification signals to identify one or more of the plurality of objects of interest, to carry out the combining of object identification signals as metadata with the primary video signal to form an image signal.

Another aspect relates to logic code stored in a non-transitory computer readable medium, including logic code controlling the receiving an image signal that includes a primary video signal representing a sequence of images that include a plurality of objects of interest and includes metadata identifying one or more of a plurality of objects of interest in respective images of the sequence of images, and logic code responsive to a selecting input to select one or more of the plurality of objects of interest based on the metadata identifying the selected one or more of the plurality of objects of interest.

Another aspect relates to the logic code altering prominence of one or more of the plurality of selected objects of interest.

Another aspect relates to a system for creating an image signal, including a camera, CCD or the like configured to obtain a primary video signal representing a sequence of images that include a plurality of objects of interest, a processor system configured to prepare object identification signals to identify one or more of the plurality of the objects of interest, and the processor system further configured to combine the object identification signals as metadata with the primary video signal to form an image signal.

Another aspect relates to a display system for displaying images, including a processor configured to receive an image signal that includes a primary video signal representing a sequence of images that include a plurality of objects of interest and includes metadata identifying one or more of a plurality of objects of interest in respective images of the sequence of images, a user input configured to select one or more of the plurality of objects of interest based on the metadata identifying the selected one or more of the plurality of objects of interest, the processor further configured to effect highlighting of the selected one or more of the plurality of objects of interest, and a display responsive to the image signal to show images with highlighting of the selected one or more of the plurality of objects of interest.

Other aspects associated with the immediately preceding aspect include one or more of the following:

The processor further configured to decode the metadata and to provide opportunity for a user to effect an input to the processor to select one or more of the plurality of the objects of interest.

Wherein the objects of interest are at least one of individual objects in a group of objects, a person in a group of persons, an animal in a group of animals, a sports object, such as a hockey puck, golf ball, tennis ball, baseball, shuttlecock, or the like, a pornographic image, or an objectionable image due to sex, violence, language or the like.

Wherein highlighting includes changing prominence of the selected object of interest relative to other portions of the image in which the object of interest is located.

Wherein changing prominence includes at least one of brightening, darkening, outlining, blurring, blacking out, or the like.

Another of the invention relates to a method of showing an image on a display, including in response to image data in an image signal showing an image on the display, and in response to metadata in the image signal adjusting at least part of the image to alter the prominence of an area of interest in the image.

Other aspects associated with the above relate to one or more of the following:

Receiving an input image signal from which the image signal is obtained.

Determining an area of interest.

Combining image data and metadata as the image signal.

The input image signal includes metadata pertaining to the area of interest in the image.

Determining the adjustment to be made to alter prominence of an area of interest in the image.

The adjusting including increasing brightness of the area of interest relative to another portion of the shown image.

The adjusting including darkening the brightness of the area of interest relative to another portion of the shown image.

The area of interest is the entire image, and the adjusting includes adjusting the entire image shown on the display.

The adjusting includes blacking out the area of interest.

The adjusting includes brightly washing out the area of interest.

The adjusting includes blurring the area of interest.

The adjusting includes outlining the area of interest.

The adjusting includes changing the color of the area of interest.

The adjusting includes blinking the area of interest.

The adjusting includes adjusting a part of the image concerning product placement.

The adjusting includes adjusting a part of the image to increase prominence of a product shown in the image.

The adjusting includes adjusting a part of the image to decrease prominence of a product shown in the image.

The adjusting to alter prominence includes decreasing prominence of an objectionable image portion.

The adjusting to alter prominence includes increasing prominence of a fast moving object in a sequence of images.

The adjusting to alter prominence includes increasing prominence of an individual object in a group of objects.

The adjusting to alter prominence at an edge of images shown respective relatively adjacent displays to decrease distinction between edges of images on the respective relatively adjacent displays by blending the edges of the images.

The adjusting includes using system synchronized brightness control.

The adjusting includes adjusting grey levels in the image.

The adjusting includes expanding the range or number of grey levels in the area of interest.

The display is a passive display and the adjusting further includes adjusting the brightness of backlighting of at least part of the display in coordinated relation with the expanding of the range or number of grey levels.

The display is a light emitting display.

Another aspect relates to a method of composing data representing an image, including obtaining digital data representing an image (image data), obtaining digital data representing location of the area of interest in the image (AOI data), and in a digital processing device combining in a composite digital data the image data and AOI data.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed.

Although the invention is shown and described with respect to certain preferred embodiments, it is obvious that equivalents and modifications will occur to others skilled in the art upon the reading and understanding of the specification. The present invention includes all such equivalents and modifications, and is limited only by the scope of the claims. Many aspects of the invention can be better understood with reference to the following drawings.

Also, although the various features are described and are illustrated in respective drawings/embodiments, it will be appreciated that features of a given drawing or embodiment may be used in one or more other drawings or embodiments of the invention.

It should be emphasized that the term "comprise/comprising" when used in this specification is taken to specify the presence of stated features, integers, steps or components but does not preclude the presence or addition of one or more other features, integers, steps, components or groups thereof."

BRIEF DESCRIPTION OF THE DRAWINGS

In the annexed drawings.

DESCRIPTION

Referring to the drawings like reference numerals designate like parts in the several figures and primed reference numerals designate similar parts to those that are designated by the same unprimed reference numerals.

Figure 1:
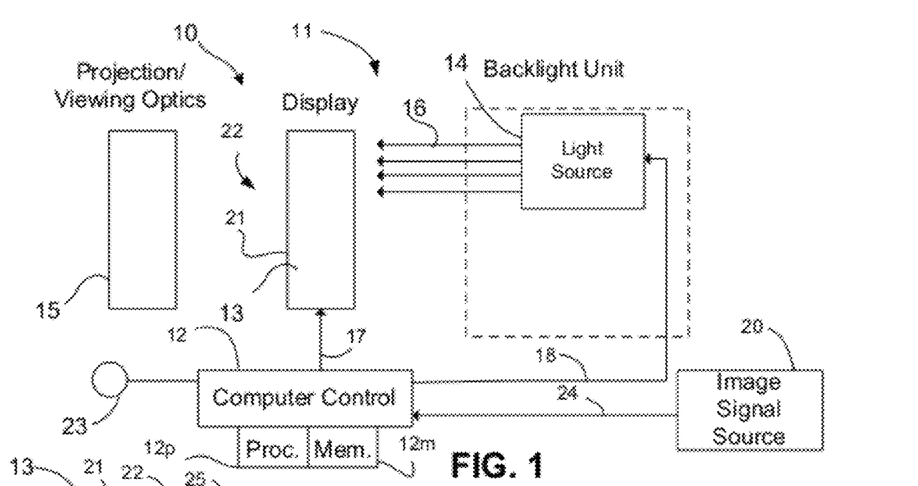
FIG. 1 is a schematic diagram of a display system configured to use features of the present invention to display images and/or to project images.

In FIG. 1 a display system 10 is illustrated. The display system 10 includes a display device 11 and a computer control 12. The display device is a passive display device and includes a liquid crystal display 13, e.g., a liquid crystal light modulating device (modulator, also referred to as LCD) and a light source 14, sometimes referred to as a backlight unit. The computer control 12 controls operation of the LCD 13 and the light source 14 to create images that are shown on the display device 11. The images may be directly viewed by a parson looking at the LCD 13 and/or the images may be projected onto a screen or other surface to be viewed by a person looking at the screen or surface. Various projection devices may be used, such as, for example, rear projection devices, reflecting projection devices, and so on. Projection/viewing optics 15 may be used to view the image on the display device 11, e.g., to magnify the image or to provide some other optical characteristic. One such other optical characteristic may be to separate left eye images and right images for 3D display and viewing purposes. The projection/viewing optics 15 also or alternatively may include projection lenses or the like to project images onto a screen, wall or other surface from which the images may be viewed.

Images may be created by the display device 11 in a conventional manner. For example, light 16 from the light source 14 may illuminate the LCD 13, and by controlling light transmission through the LCD, images may be created. The images may be monochromatic, black and white, multicolor, and so forth. Various techniques to produce such images in a display device 11 are known. As but one example, by controlling light transmission through respective portions, e.g., pixels, images may be formed. The computer control 12 may control which pixels are transmitting light and the degree of transmission or attenuation of light, and the computer control may control the LCD 13 to block light at respective pixels. The computer control 12 also may control the light source 14 to adjust the intensity or brightness of the light 16 that illuminates the LCD 13. Thus, respective signal, power, and/or control connections 17, 18 are provided from the computer control 12, respectively, to the LCD 13 and the light source 14.

An image signal source 20 provides image signals to the computer control 12, and the computer control 12 is configured to respond to the image signals (sometimes referred to as video signal, for example) to provide appropriate image information (sometimes referred to as the display signal or video display signal, for example) to the LCD 13 and also to the light source 14 to operate them and, thus, to provide for the display device 11 to show an image on the face, screen or the like 21 of the LCD as the image output 22 therefrom.

The image signal source 20 may be any of a wide variety of devices that provide image signals to the computer control 12. For example, the image signal source may be a connection to receive image signals transmitted via over-the-air broadcasting or transmission, a cable connection to a cable television source, a satellite link or connection, a digital video disc (DVD) device, a video tape player (e.g., VCR), a compact disc player, a Blu-Ray player device, a HD DVD (high definition digital video disc) device, a network (e.g., the Internet) or some other network, and so on. A manual input 23 also is coupled to the computer control 12 to permit a user to provide an input control or adjustment to the computer control. The computer control 12 includes logic, computer program, circuitry, and the like that is configured and responsive to the image signal received from the image signal source and to control inputs provided by a user at input 23 to provide and/or to adjust image information to operate the display device 11 to show an image on the display device 11 for viewing and/or for projecting the image. The input 23 may be a computer, connection to a computer, a remote control device, or virtually any device or connection to permit a user to provide inputs to the computer control 12.

The computer control 12 may include a processor 12$p$, such as a microprocessor or other logic processing device or signal processing device. The computer control 12 also includes appropriate memory 12$m$ for storing data and/or logic and/or computer program instructions. The memory may be in the form of a non-transitory device or non-transitory computer readable medium, such as, for example, an electronic or solid state memory, a hard disc drive, or any other memory device(s). Many modern television systems include display device 11 and computer control 12 with appropriate logic software, hardware and so on to respond to image signals to provide image information to display device to show an image for viewing and/or for projecting. These are exemplary of a computer control 12 and a display device 11 useful in the present invention.

In accordance with an embodiment, the display system 10 includes an input 24, e.g., from an image signal source 20, a computer control 12 including a processor and is configured, e.g., by hardware and/or software, circuit connections, and so on, to decode image signals having image information representative of an image and metadata information representative of an area of interest of the image. Moreover, the computer control is configured to adjust the image information based on the metadata information. For example, the metadata information may be representative of a function that causes the computer control 12 to alter prominence of the area of interest relative to other portions of an image; exemplary forms of altering prominence may be brighten, darken, blur, highlight, feather, outline, and so on the area of interest. The AOI may be highlighted by making it substantially uniformly bright, uniformly dark, outlined, flashing, blurred or some other function or feature. The metadata may identify the location of interest in the image that is shown or is to be shown by the display device 11. The adjusted image information is provided from the computer control 12 to the display 13 via connection, e.g., an electrical or optical cable, wireless, or some other connection or the like, which is designated by reference numeral 17 and also may be provided to the light source 14 via connection 18. Adjustment of image information related to AOI may include matching or adjusting color and/or size of an AOI relative to the main portion of an image.

Figures 2, 3A, 3B, 4, 5:
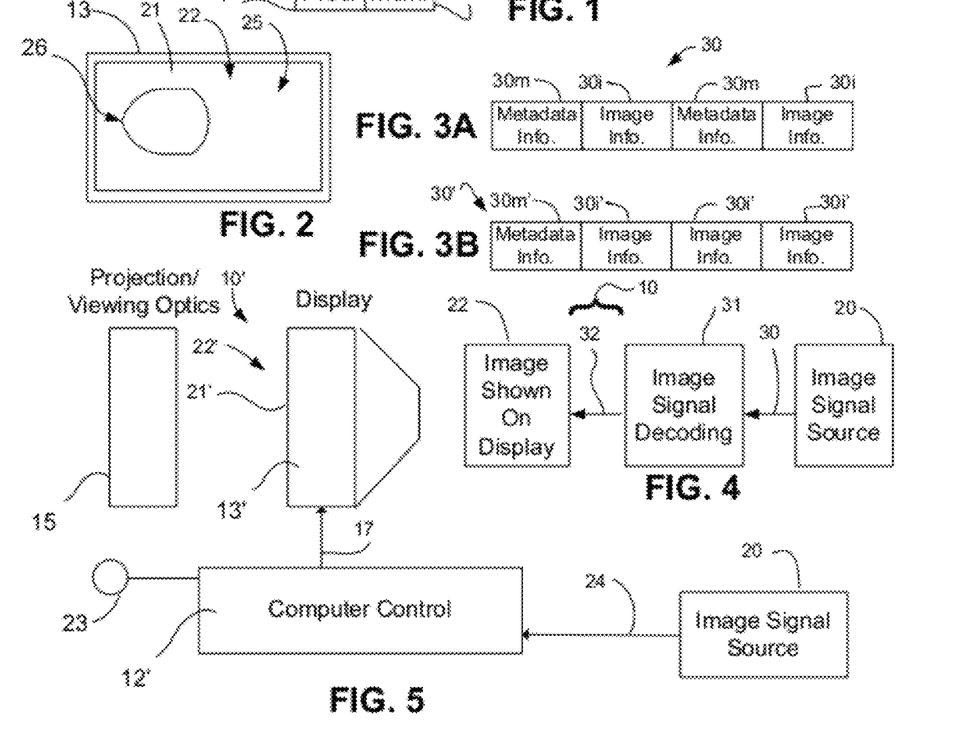
FIG. 2 is a schematic illustration of an image having an area of interest shown on a display.
FIG. 3A is a schematic representation of an exemplary image signal that represents two sequential frames of an image in a sequence of many frames of respective images to be shown on a display, the signal data for each frame including an image information portion and a metadata information portion.
FIG. 3B is a schematic representation of an exemplary image signal that represents one metadata information portion and three sequential frames of an image in a sequence of many frames of respective images to be shown on a display, the metadata information applying to two or more frames of an image.
FIG. 4 is a schematic illustration of signal processing steps to shown an image on a display.
FIG. 5 is a schematic illustration of a display system similar to the display system of FIG. 1, but here using a light emitting type of display.

Turning to FIG. 2, an image display screen 21 showing an image output 22 is illustrated. The image output 22 includes a main portion 25 of the image output and an area of interest (AOI) 26. The image signal source 20 provides an image signal As is illustrated in FIG. 2, the area of interest (AOI) 26 is one specific area of the image output 22. The rest of the image output 22 is the main portion 25 of the image shown on the display screen 21. There may be more than one AOI in the image output 22. In an embodiment the entire image output is the AOI as is discussed further below, for example, when a particular image is objectionable, such as a particularly violent, honor, pornographic, or other image type that may be objectionable to a given viewer, class of viewers, and so on. Further description of various exemplary types of areas of interest is presented below with respect to FIGS. 8-15.

Briefly referring to FIG. 3, an example of an image signal 30 from an image signal source 20 (FIGS. 1 and 3) is illustrated schematically. The image signal 30 includes metadata information 30m and image information 30i. In the exemplary image signal 30, the information or data may be provided as digital signals in a stream of data, wherein a data word for a given frame or image to be shown on the display 13 may include both a metadata information portion 30m and an image information portion 30i. The image signal 30 may be stored in memory 12m. Two such frames are illustrated in the image signal 30 in FIG. 3, but it will be appreciated that there may be many more sequential frames provided in the overall image signal to create a motion picture, for example, that is to be shown on the display 13 or even one or several still images to be shown on the display 13. Thus, the portion of the image signal 30 shown in FIG. 3 only represents a small portion of a stream of data representing an image signal provided by the image signal source 20 to the display system 10, for example.

In the image signal 30 the metadata information 30m for each frame precedes the image information portion 30i. The metadata information portion may follow the image information portion, if desired. Moreover, a single metadata information portion or several metadata information portions may be used to provide information relating to the image information portions of several frames in the image signal. As an example, the metadata information 30m may identify the location in an image output 22 (FIG. 2) of an AOI 26 and/or the characteristics of the AOI. For example, the characteristic of a given AOI 26 may be altered in its prominence relative to another portion of the image in which it is located such that it is to be made brighter, darker, blurred, flash (made to blink of flash), blocked out entirely, highlighted, outlined, etc. relative to the main portion 25 of the image output 22. Various image adjusting techniques may be used to carry out the intention of the metadata information with respect to one or more frames created by image information for showing as the image output 22 on the display 13 in the display system 10. Although one type of image signal 30 is illustrated in FIG. 3, it will be appreciated that other types of image signals that include metadata information and image information may be supplied to the display system 10 to carry out the operational functions described herein. The metadata information may be in a portion of the image signal that does not include image information, e.g., being in areas between respective image information portions that represent respective frames to be shown on the display 13. The metadata information 30m may be in a header or a trailer of a group of frames represented by respective image information portions 30i of an image signal, and so on.

FIG. 3B is an example of an image signal 30', which is similar to the image signal 30 described above with respect to FIG. 3A, except that in the image signal 30' includes a single metadata information portion 30m' and a plurality of image information portions 30i'.

As is represented in FIG. 4, the image signal source 20 provides the image signal 30 to the display system 10. In the display system 10 the computer control 12 carries out an image signal decoding function 31 to obtain the adjusted image information 32 via the connection 17 from the computer control 12 to the display 13. The output image 22 shown on the display 13 is represented in FIG. 4 resulting from the adjusted image information 32 that is provided to the display 13. Although not illustrated in FIG. 4, the adjusted image information 32 also may include a component provided by the computer control 12 to adjust brightness of the light source 14, for example, as the computer control provides for control of the light source via signals provided on connection 18 (FIG. 1).

Thus, it will be appreciated that the computer control 12 receives the image signal via connection 24 from the image signal source 20. The processor accordingly, is configured to decode the image signal that has image information 30i, for example, and metadata information 30m, for example, so as to provide an adjusted image information to the display 13, which accordingly shows an image output with an appropriately defined and adjusted, if necessary, AOI 26 (FIG. 2). The computer control 12 may be configured to carry out such decoding and adjusting of the image signal based on configuration carried out by computer program software, logic code, hardware, and so forth that may be provided in the computer control, e.g., stored in memory 12m, and/or based on portions of the image signal received from the image signal source 20. Further, the computer control 12 may be configured such that it can recognize appropriate metadata information 30m and distinguish it from image information 30i so as to accommodate receiving and decoding different respective styles, formats and so on of image signals. Still further, the computer control 12 may be configured such that upon receiving an image signal that does not include metadata information, the computer control would operate the display 22 to show the images without adjusting the image information in the manner described above.

In operation of the passive display system 10 of FIG. 1, the image signal source provides an image signal via connection 24 to the computer control 12. The computer control 12 decodes the image signal and based on the metadata information, if any, contained in the image signal adjusts appropriately the area(s) of interest to obtain the adjusted image information that is provided via connection 17 to the display 13. The image signal and the adjusted image information may be stored temporarily or longer in memory 12m. The display 13 shows at the image display screen 21 the image output 22; and if the image output includes one or more areas of interest, shows those areas of interest 26, for example, in the appropriate places/locations in the main portion 25 of the output image (FIG. 2). The computer control 12 also may appropriately adjust the light source 14 based on signals provided via the connection 18 to the light source. Accordingly, image outputs having one or more areas of interest (or not areas of interest) that are appropriately adjusted may be shown on the image display screen 21 as the image output from the display 13. The image output may be viewed directly or may be projected or viewed via projection/viewing optics 15. If desired, a user may provide an input control or adjusting function via the input 23 to the computer control 12 to carry out various functions, such as, for example, to brighten or darken the overall image, to adjust contrast of the image, and so on.

FIG. 5 illustrates a light emitting display system 10', as compared to the passive display system 10 of FIG. 1. The display system 10' includes a computer control 12' and a light emitting display 13', for example, a CRT type of display. Optional projection/viewing optics 15 may be included in the display system 10'. The display system 10' receives an image signal from an image signal source 20 via a connection 24 provided to the computer control 12'.

In operation of the display system 10' of FIG. 5, the computer control 12' responds to the image signal provided from the image signal source 20 via the connection 24 and may appropriately adjust the image signal and provide an adjusted image signal to operate the light emitting display 13' so that the image display screen 21' shows an image output 22' for direct viewing or projection. The image output may include one or more areas of interest that may be appropriately adjusted in brightness, darkness, blurring, etc., as was mentioned above. Such area(s) of interest and the character thereof may be obtained by the computer control 12' providing signals to the respective pixels of the display 13' that form the image output 22' of the display 13' in a manner generally similar to that described above.

Figure 6:
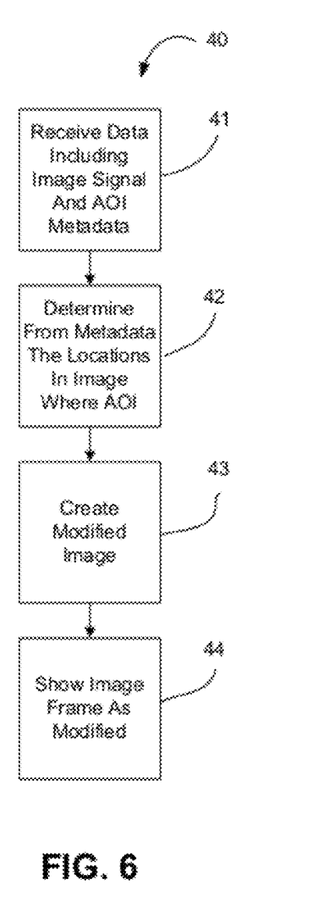
FIG. 6 is a logic diagram, also sometimes referred to as a flow chart, illustrating an example of steps carried out in practicing the invention using area of interest metadata.

FIG. 6 illustrates an exemplary logic diagram or computer flow chart 40 representing an example of the operation of the display system 10. At step 41 data including an image signal and area of interest information metadata is received. For example, such data may be received as the image signal from the image signal source 20 via input connection 24 provided to the computer control 12. At step 42 the computer control determines from metadata information, e.g., 30m in FIG. 3, the one or more locations in the image where there is an area of interest and also determines how the area(s) of interest is (are) to be treated, e.g., altered in prominence, such as, for example, highlighted, brightened, darkened, blurred, blocked out, and so on. At step 43 the computer control creates a modified image that includes both a main portion 25 (FIG. 2) and one or more areas of interest 26 (FIG. 2) as would be represented by adjusted image information. The modified image is provided to the display 13 as the adjusted image information via connection 17. The foregoing steps 41-43 may be carried out in the computer control 12 based on the configuring of the computer control based on logic, computer program, hardware, and so on, which may be designed and created by a person who has ordinary skill in the art to carry out those steps.

At step 44 in the logic diagram 40 of FIG. 6, the image output based on the image signal from the image signal source 20 as modified by the computer control based on metadata information is shown on the image display screen 21 of the display 13 as the image output 22.

For the passive display system 10, for example, the computer control 12 may increase or decrease (including may block) light transmission of one or more pixels of the light modulator device of the display 13 to create the image using light from the light source 14 to be displayed based on the adjusted image information (line/connection 17). The adjusted image information includes the intended treatment of the AOI 26, e.g., brighten, dim, highlight, and so on relative to the main portion 25 of the image output 22, so that the AOI is shown in the main portion of the image output as represented by the metadata 30m that is decoded by the computer control 12.

Operation of the light emitting display system 10' may be similar to the operation of the passive display system 10, except the respective pixels of the display 13' would be controlled to emit light according to the adjusted image information, e.g., as provided by the computer control 13' and provided the display 13' via line 17. Thus, the pixels of the display 13' would be controlled to emit light or not to emit light and the brightness and color thereof, for example, to form the image output 22' with appropriately located and treated AOI(s).

Figure 7:
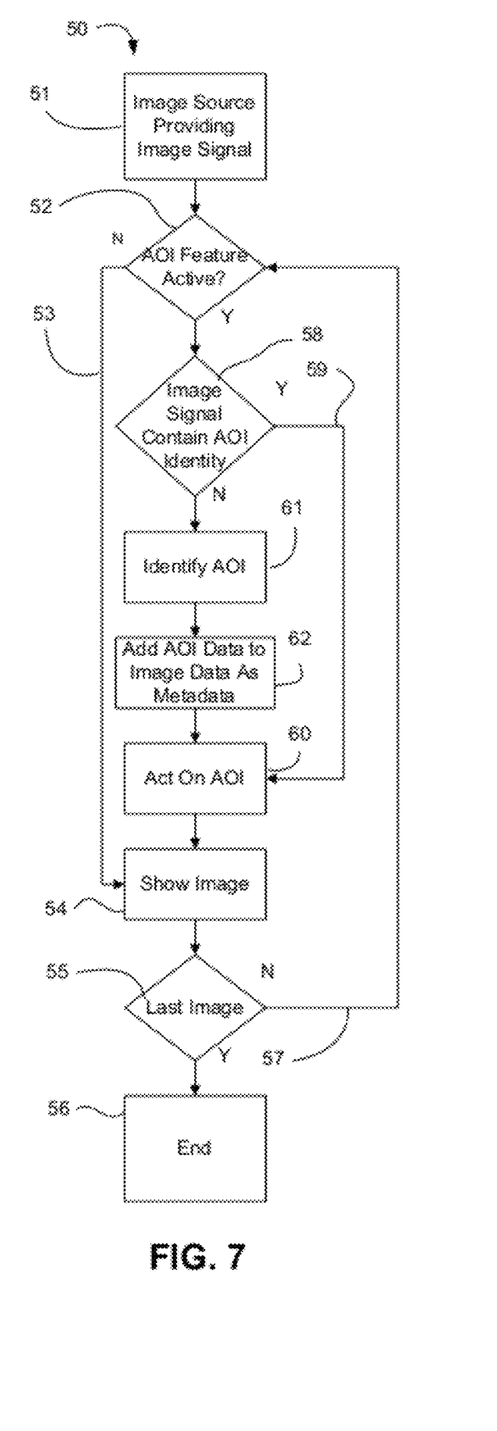
FIG. 7 is a logic diagram or computer program flow chart illustrating method steps or procedures to carry out the invention using metadata and image data to create and show an image.

Turning to FIG. 7, a logic diagram or computer program flow chart 50 illustrating method steps or procedures to carry out exemplary operational aspects of the invention using metadata information and image information (also sometimes referred to as image data) to create and to show an image is shown at 50.

At step 51 the image signal source (e.g. 20) provides the image signal to the display system 10 or the display system 10'. At step 52 an inquiry is made whether the display system 10 or 10' has the AOI feature active. If not, then line 53 is followed to step 54 at which the image is shown, for example, on the display 13 or 13'. At step 55 an inquiry is made whether the image being shown or received to be shown is the last image in a sequence of images, for example, those in a sequence of images making up a motion pictures. If the image is the last image in a sequence, then at step 56 the logic diagram 50 ends; for example, the movie is over. However, if at step 55 the inquiry result is negative, then line 57 is followed back to step 52, and the routine repeats as described just above. In the above description, the AOI feature being inactive may be due to various reasons. One example is a user applies an input signal, operates a switch, makes an adjustment, etc. at the user input 23 indicating that the user does not want the AOI feature to adjust the image signal; in such case the adjusted image information provided by the computer control via line 17 to the display would be the same as the image information obtained from the image signal source 20. In this case if the input image signal includes metadata information (30m), it would be ignored by the display system. Another example is the image signal may not include metadata information, and, therefore, the AOI feature would not be active.

At step 52 if it is determined that the AOI feature is active, then at step 58 an inquiry is made whether the image signal contains AOI identity information, such as, the location of the one or more AOIs and how to treat each AOI, e.g., to brighten an AOI, dim an AOI, blur the AOI, etc., as is described elsewhere herein. If the answer at step 58 is affirmative (yes), then line 59 is followed to steps 60 at which the computer control 12 or 12' of the display system may act on the AOI information. Acting on the AOI information may include, for example, designating that part of the image information of the image signal at which the area of interest is located (or the areas of interest are located) and how they should be treated, e.g., brightened, dimmed, blurred, etc., as is mentioned elsewhere herein. The computer control 12 or 12' then prepares the adjusted image information that may be provided to the display 13 of 13' to cause an image output 22 (FIG. 2) to be shown with appropriate main portion 25 and area(s) of interest 26 appropriately treated as brightened, dimmed, blurred, etc. At step 54 the image output 22 is shown. At step 55 an inquiry is made whether the image is the last image in a sequence of images. If not, then loop 57 is followed back to step 52, as was described above; and if the answer is yes, then the steps of the logic diagram 50 end at step 56.

If at inquiry step 52 it is determined that the AOI feature is active, e.g., is operational in the display system 10 or 10' and at inquiry step 58 it is determined that the image signal does not contain AOI identity information, then at step 61 the AOI is identified. For example, the editor of a video may designate a part of an image as an AOI thereby to identify the AOI. The AOI may be, for example, an objectionable image or a portion of an image, a fast moving object, a portion of an image that it is desired to highlight for a given reason, and so on as is described elsewhere herein and as may be some other case. The editor may identify the location of the AOI and also may indicate how the AOI is to be treated, e.g., to brighten, enhance, dim, blur, block, and so on as is described elsewhere herein. At block 62 the AOI data representing the identity of the AOI and how the AOI is to be treated, e.g., as was described just above, is added to the image data or image information as metadata information thereby to form the image signal 30 (FIG. 3) containing both metadata information 30m and image information 30i for respective image outputs, e.g., frames or images, that are intended to be shown on the display. Thus, the image signal containing both metadata information and image information is ready to be provided to the display system 10 or 10'.

Continuing to refer to the logic diagram 50 of FIG. 7, the image signal containing metadata information and image information is provided the display system 10 or 10', and at step 60 the display system acts on the AOI as was described above, e.g., to provide adjusted image information including representations of AOI(s) 26 and main portion 25 (FIG. 2). Subsequently the image is shown at step 54, and the logic diagram 50 continues at step 55, as was described above.

Thus, the logic diagram 50 of FIG. 7 includes portions, such as, for example, step 51 at which the image signals are received from the image signal source 20 (FIG. 1), step 54 to show images, step 60 to act on AOI information to create adjusted image information to be used to show an image at step 54; and steps 61 and 62 to identify AOI and to prepare an image signal 30 that includes both metadata information 30m and image information 30i, e.g., as is illustrated schematically in FIG. 3. Identifying the AOI and/or the characteristics desired for the AOI may be provided by a user of the display system 10, 10' by applying appropriate inputs to the computer control 12, 12' via the user input 23.

It will be appreciated that the flow chart 50 in FIG. 7 is a composite of several portions that may be part of a single computer program or logic or may be several portions or parts. For example, as several parts, the steps 61 and 62 may be carried out separately from the flow chart 50, e.g., at an editing studio where an editor views a movie, manually or automatically selects AOIs and, thus identifies the AOIs (step 61). The function of step 62 may be carried manually or automatically, whereby the AOI data is combined with image data to create an image signal 30. The image signal can be stored, e.g., on a video disc, hard drive, solid state memory or other memory or storage medium, etc. for subsequent use, sale, etc. Subsequently, the storage medium can be played to provide the image signal from an image signal source device, e.g., a DVD player, a connection to a network, a Blu-Ray player, and so on as the image signal source, a display system for use as was described above.

It also will be appreciated that although the various parts of the display systems 10, 10' are shown as separate components, e.g., 12, 13, 14 (and possibly 15) in the display system 10 and as 12', 13' (and possibly 15) in the display system 10', two or more of those components may be combined a single component. For example, many modern televisions, laptop computers, even mobile electronic devices such as mobile phones and other display systems include computer controls, e.g., systems with processors, memory, and associated circuitry and computer programming or logic.

Referring to FIGS. 8-13 examples of areas of interest (AOI) are illustrated. The respective areas of interest are designated by reference numeral 26 plus a suffix portion referring to the figure number, e.g., in FIG. 8 there are two AOIs 26-8a and 26-8b (the letters a and b distinguishing the respective AOIs.

Figure 8:
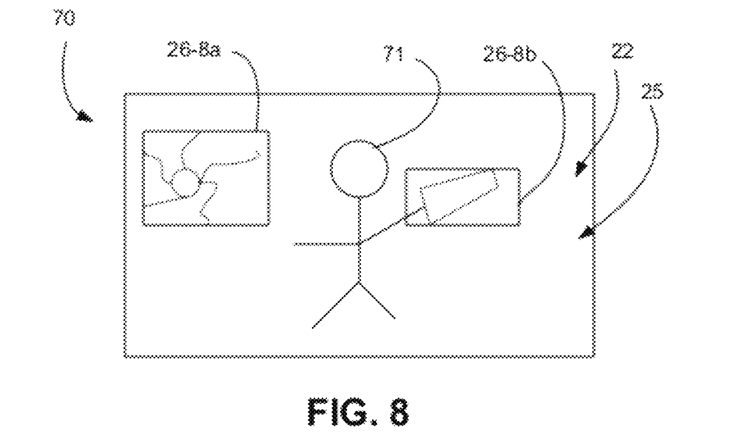
FIG. 8 is a schematic illustration of an image shown on a display, the image including portions that are of dangerous and/or objectionable character.

In FIG. 8 an image 70 is shown in which the area of interest may be an objectionable portion 26-8a and 26-8b of the image output 22, the balance of the image output, e.g., the image of a person 71, being the main part 25 of the image output. For example, the objectionable portion in FIG. 8 exemplifies violence such as an explosion 26-8a, a person shooting a weapon 26-8b, a wounded individual (not shown), and so on. Another example of an objectionable image may be a pornographic image. Instead of using a V-chip to stop a showing of a movie that includes pornographic scenes or risque scenes, the display system and methods described herein may be used to block portions, e.g., AOIs 26-8a and 26-8b, of an image that might be offensive to a given viewer, e.g., a young child, but other portions of a given scene or of the movie as a whole may still be permitted for viewing by the given viewer. For example, the steps 61 and 62 that are described above may be used to identify areas of interest and to add AOI data to image data to compose image signals of the type shown at 30 (FIG. 3) for use as described above to block or to deemphasize the objectionable part of the image output or even the entire image output of a given scene. The foregoing is one example of an objectionable image type of area of interest. Of course, there may be other types of objectionable areas. In some circumstances the AOI may be an image of a human being or of an animal and the AOI may be adjusted according to whether to highlight or emphasize or to block or deemphasize the image of the human being or animal.

Figure 9:
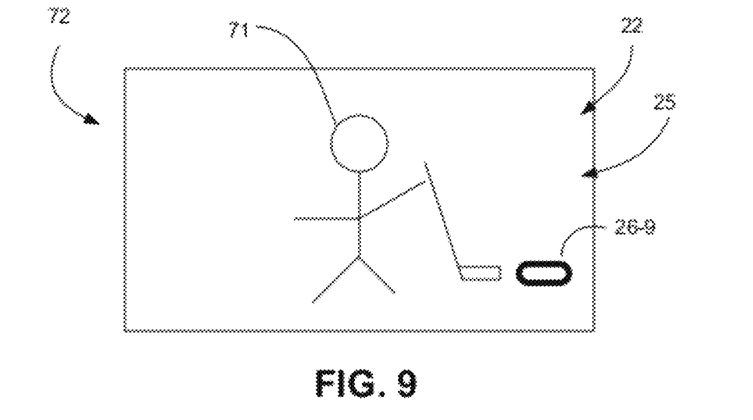
FIG. 9 a schematic illustration of an image shown on a display, the image including a fast moving object.

In FIG. 9 an image 72 is shown in which the area of interest 26-9 is a moving object, such as, for example, a hockey puck, a football, golf ball, baseball, and so on. The fast moving object 26-9 and sometimes many other objects in the field of view of the image output 22 shown in a televised or video played sporting event may be so complex or moving so fast that sometimes the viewer loses track of the object, such as, who has possession of the hockey puck or the football in the course of viewing a game shown on a display. As another example a golf ball or baseball may be lost against the sky or other background in the image output. These are collectively referred to herein as examples of moving objects area of interest. As is illustrated in the image 71 of FIG. 9, the illustrated hockey puck 26-9 is a highlighted AOI. The computer control 12, 12' is configured to highlight the outline of the hockey puck, to make it flash, to brighten it, and so on.

Figure 10:
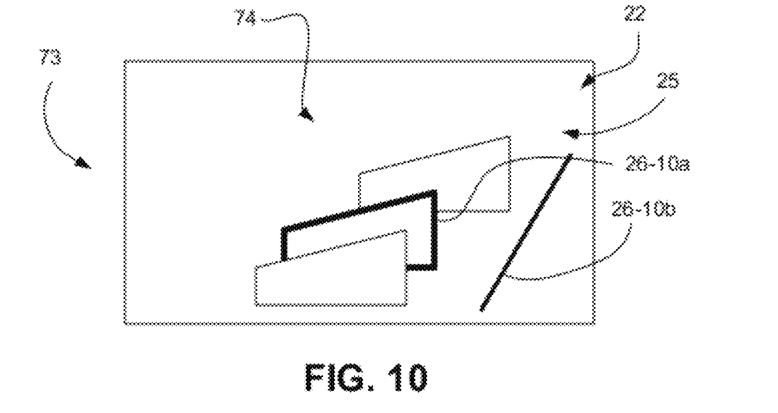
FIG. 10 is a schematic illustration of an image shown on a display, the image including a collection of objects.

In FIG. 10 one or more individual objects 26-10a in a group 74 of objects is another example of area of interest. For example, consider a car race where many similar cars are racing about a race track and are constantly changing relative positions on the track; or consider a horse race where a group of horses are running about a track. A viewer can easily lose sight of an individual car or horse that is of particular interest. In a nature show a viewer can lose track of one animal of interest in a group of many animals, such as, for example, a single elephant in a herd, a single fish in a school, a single bird in a flock, a person in a crowd, and so on. As is shown in FIG. 10, the AOI 26-10a representing a race car or race horse in a race, and the AOI is highlighted, e.g., as was mentioned above for the hockey puck 26-9 in FIG. 9. Such highlighting facilitates a viewer keeping an eye on the particular car or horse of interest. Many times such races shown on television do not clearly show the finish line, as it may be a thin wire, string or ribbon. In FIG. 10 the finish line is a highlighted AOI 26-10b which may facilitate a viewer seeing which of the racers has finished first in the race.

Figure 11:
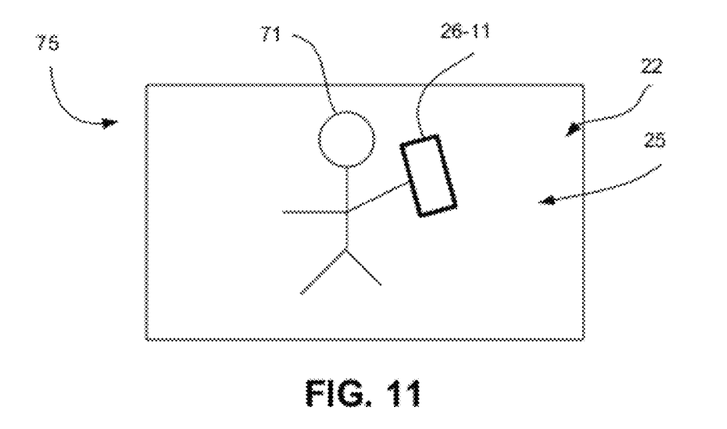
FIG. 11 is a schematic illustration of an image shown on a display, the image including a promotional object.

FIG. 11 illustrates an image 75 as an example of product placement, which is another example of area of interest. In modern movies, advertisers pay the producers a fee to have their products prominently placed in a film. An example may be to have a famous actor or actress drink a particular beverage that has a label clearly displayed during a conversation scene. A product placement of this type is artistically/creatively built into the film and may generate a separate revenue stream to the makers of the movie. Such product placement is relatively recent; it did not exist in older movies that do not contain deliberate product placement. However, such older movies may include images of actors in a room drinking a beverage; the beverage container and its label may not be prominently placed in the image but rather may be obscure in the background of the image. The AOI 26-11 is an object, such as a beverage bottle of soft drink (or other beverage), that may not have a prominently shown label in the image output 22 or the label may be rather dim. Using the computer controls 12, 12' in the display systems 10, 10', the beverage bottle 26-11 may be highlighted, e.g., brightened or outlined or have a label superimposed thereon, thereby to enhance the image of the AOI and bring advertising or like attention of the brand of the beverage to a viewer.

Figure 12:
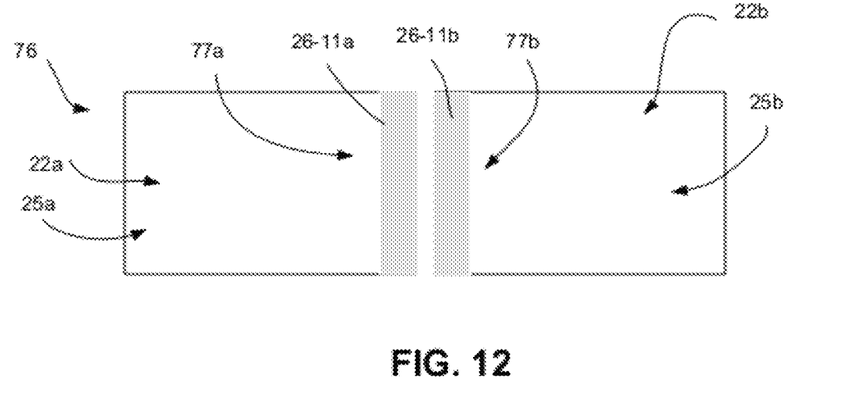
FIG. 12 is a schematic illustration of a pair of display screens having respective images with edge portions intended to be blended or knit.

In FIG. 12 an image 76, which is composed of two image outputs 22a, 22b that are provided on different adjacent displays, shows another type of areas of interest 26-12a, 26-12b as the edge portions of two images 77a, 77b that are intended to be shown in adjacent relation. An example may be two image outputs 22a, 22b that are to be shown in side-by-side relation to create the appearance of a large image, one part of the large image being shown on one display and the other part on an adjacent display. The two images are intended to be knitted together in a manner such that the person viewing the large image does not have a strong awareness of the seam where the images are knitted. However, sometimes it is difficult to align the adjacent images with perfection and sometimes the screens or the like on which the images are shown may not be perfectly aligned or may have small space between them, and so on, all of which may tend to increase the awareness of the seam. Thus, the adjacent edges of two images may be considered areas of interest. The AOIs 26-12a, 26-12b may be deemphasized as by dimming them, slightly blurring them to avoid highlighting the fact that the two images are joined to make a single image and/or reducing the visual appearance of knitting together the edge portions. Thus, a viewer may focus attention on the brighter main part 25a, 25b of the respective image outputs 22a, 22b, and, therefore, not realize that the overall combined image is made of two images in adjacent relation.

Figure 13:
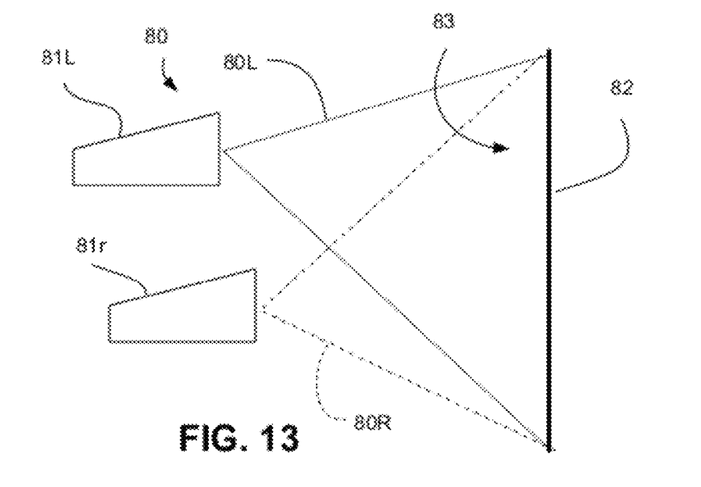
FIG. 13 is a schematic illustration of a 3-dimensional (3D)/stereoscopic display system.

FIG. 13 illustrates a further example of area of interest that arises in the environment of three dimensional (sometimes referred t as 3D or as stereoscopic) display. In 3D display systems, such as that shown at 80 in FIG. 13, images intended to be viewed by the left eye of a viewer, e.g., the illustrated left eye image 81L, and images intended to be viewed by the right eye of the viewer, e.g., the illustrated right eye image 81R, are shown on a display. In the illustration of FIG. 13, the 3D system is a projection system that uses projectors 82L, 82R to project the respective left and right eye images 81L, 81R onto a screen 83 to provide a composite image 84 for viewing; when the composite image 84 is appropriately viewed to discriminate for the left and right eyes of the viewer to see only, respectively, the left and right eye images 80L, 80R, the viewer will perceive depth in the image composite image and, thus, perceive a 3D or stereoscopic image. Discrimination may be provided using color filters or polarizing filters in viewing glasses, as is known. Other possible discrimination techniques also may be used.

In stereoscopic (3D) display systems, it is desired that all qualities of the two images in the pair of images 80L, 80R are identical except for horizontal parallax. These other image qualities include, for example, brightness, color, resolution, and geometrical qualities. If the images are not identical, then the viewer will experience eye strain with prolonged viewing and possibly the 3D effect can be lost. For a stereoscopic display system the light path from the directly viewed display or a screen on which an image is projected to the right eye and the light path from the display or screen to the left eye should be but may not be identical. Although the two light paths to the eyes can be very similar, they usually are not exactly the same, and, therefore, this characteristic introduces undesired differences between the right eye and the left eye images. Similarly, for a projection display, the actual location of two projectors 81L, 81R, for example, that project, respectively, the left eye image and the right eye image, may not be precisely the same distance from the screen or the like on which the images are projected. These differences introduce differences in the left eye and right eye images seen by a viewer.

As was mentioned above, the area of interest may be the entire image from a display. Thus in the 3D display systems the AOI may be one entire image, e.g., the left eye image, that itself needs to be adjusted to be substantially of the same characteristics as the other eye image, e.g., the right eye image, except for mentioned parallax in order to tend to optimize the displayed and viewed image. The one or more processors in the computer control(s) for two projection display systems 81L, 81R or even for a single display system that is not of the 3D type may be used to respond to AOI adjustments to match brightness, to match color and/or to match size of respective images or of different parts of a given image output 22.

As the adjusting of images is described herein, an exemplary technique for making adjustments of image brightness, contrast, resolution, color and the like may be carried out using a technique known as system synchronized brightness control (SSBC) and sometimes known as dynamic contrast control. In passive display systems that use SSBC, for example, the grey levels of the image can be adjusted to alter brightness, contrast and/or for other purposes. As an example, such adjusting of grey levels may be carried out by expanding at least one of the range or the number of grey levels used to show the image; also the brightness of the illuminating light source, e.g. light source 14 (FIG. 1) may be adjusted as the grey levels are adjusted. Such adjusting of grey levels may be carried out at the AOI 26 and/or at the main part 25 of an image output 22 to obtain the above-described effect on the AOI and/or on the AOI relative to the main part of the image output.

Figure 14:
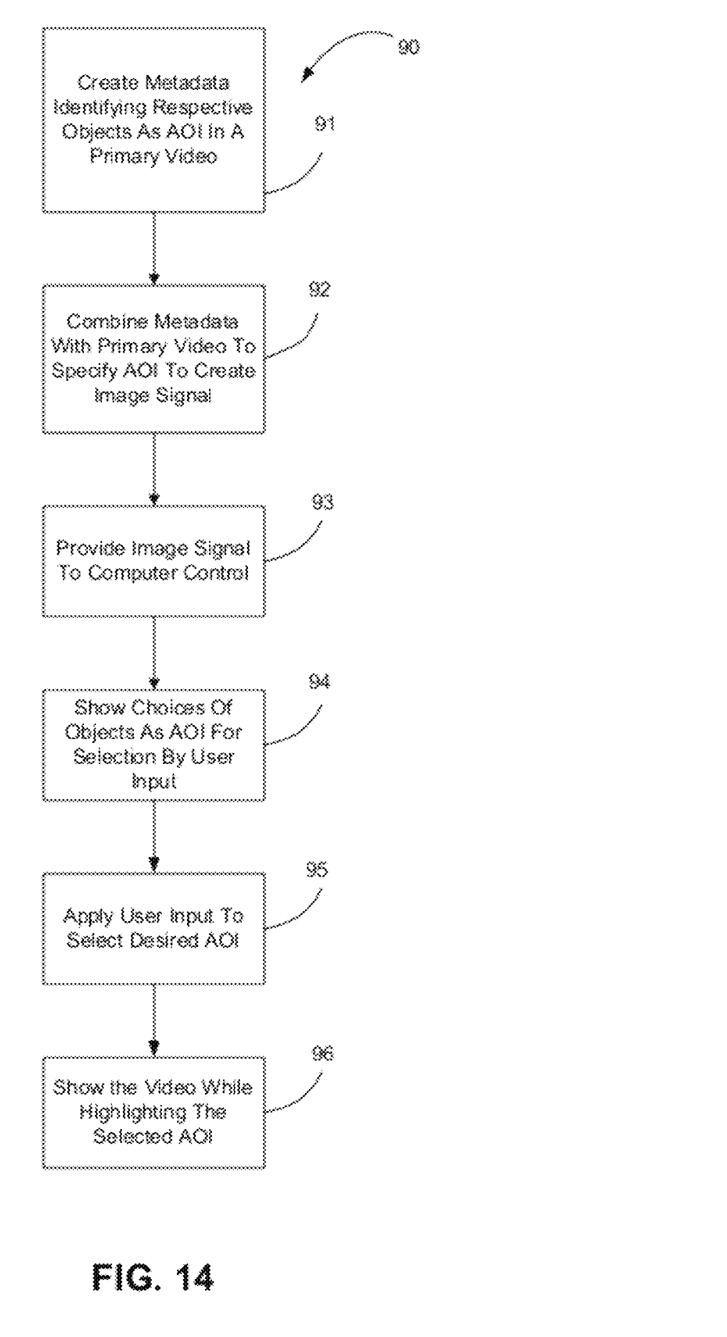
FIG. 14 is a logic diagram or computer program flow chart illustrating method steps or procedures to carry out the invention using metadata and image data together with a user selection function to select objects of interest (AOI).

FIG. 14 is a schematic illustration of a logic diagram or computer program flow chart 90 illustrating method steps or procedures to carry out the invention using metadata and image data together with a user selection function to select objects of interest (AOI).

At step 91 metadata identifying one or more respective objects as area (or areas) of interest (AOI) in a primary video are created. Various AOI are described above. As but one example here, the objects of interest may be several horses running in a race, each horse having a respective identifier in the metadata; or, as another example, the objects of interest may be the puck and the players in a hockey game, each of which has a respective identifier in the metadata. The primary video may be the video of the horse race or of the hockey game. Other examples of such objects of interest are described elsewhere herein and still others may occur, for example, depending on what the primary video concerns, e.g., sporting event, race, dramatic movie, and so on. Various techniques may be used to create the metadata so that respective objects will have respective identifiers and the metadata is assembled appropriately so that it is available for user selection, as is described further below.

At step 92 the metadata is combined with the primary video to specify AOI to create the image signal. The metadata information may be combined with the primary video information, e.g., as is discussed above with respect to FIGS. 3A and 3B, or in some other way.

At step 93 the image signal is provided to the computer control, e.g., to computer control 12. The image signal may be provided to the computer control 12 via any of the ways described above from an image signal 20 or the image signal may be provided in some other way. As an example, the image signal may be created at step 92 and directly provided to the computer control 12 at step 93. As another example, the image signal may be created at step 92 and stored for subsequent use as an image signal provided to a computer control 12, e.g., via any of existing techniques described above, such as via cable or satellite, via Blu-Ray, DVD, server, computer, or some other technique, and so on.

As an example, steps 91 and 92 may be carried out during the making of a movie, video, etc.

At step 93 the image signal is provided the computer control so the video can be viewed, e.g., by direct viewing or projection on any of many different display and projection devices. Exemplary user input possibilities may be provided, as is described further just below.

At step 94 choices of objects as AOI are shown as possibilities for selection by user input. The choices may be made available during a setup procedure at the beginning of showing of the video represented by the image signal and/or the choices may be made available during the showing of the video. For example, with respect to a hockey game, the user may want to focus attention on a specific hockey player and/or on the hockey puck, or for a horse race the user may want to focus attention on a specific horse; and, accordingly, the choices of players and/or hockey puck may be shown to the user on the display 13 (FIG. 1).

At step 95 the user may apply a selection, e.g., select one of the choices provided at step 94, of a desired player, puck, horse, and so on by providing an input at the user input 23 (FIG. 1), e.g., by pressing a button or key on a remote control device or be pressing a button or key on the computer control, or by some other way of providing a signal to the computer control 12 as a user input.

At step 96 the video may be shown by the computer control 12 operating the display 13 to show the video such that the AOI (if selected) is highlighted. If no AOI is selected, then the video may be shown without any highlighting or with some kind of automatic highlighting. For example, a video that includes PG-rated and R-rated scenes may be pre-set such that all R-rated scenes or part(s) of the R-rated scenes are considered AOI and are blocked as was described above, unless a user input is provided that removes the blocking and allows showing of those R-rated scenes or scene portions.

As an example of carrying out the method represented in the logic diagram 90 of FIG. 14, for example, as is represented by steps 91-93, an image signal is created, for example, by first obtaining a primary video signal representing a sequence of images that include a plurality of objects of interest. Object identification signals are prepared to identify one or more of the plurality of the objects of interest. The object identification signals are combined as metadata with the primary video signal to form an image signal. As an example, the primary video signal may be obtained using a video camera, a cartoon or computer drawing program, and so on. The object identification signals may be prepared by an editor manually identifying an object of interest in an image, and in subsequent images of a sequence of images; alternatively, the editor may manually identify the object of interest in an image, and then image recognition software may be used to identify that object of interest in subsequent images. As still another example, the object of interest may be designated by an electromagnetic energy signal, e.g., as in an RFID device, attached to a hockey puck or by respective RFID or other devices attached to respective horses or runners in a race, and so on. The primary video signal and the metadata may be combined electronically or in some other way, e.g., as is schematically illustrated in FIGS. 3A and 3B.

The combining may include placing the metadata in the image signal to be decoded to identify one or more selected objects of interest as area of interest for showing via a display system.

The preparing object identifying signals may be respectively identifying objects amount a group of objects in respective images in the sequence of images. The preparing object identification signals may include selecting objects based on shape, color, size, electromagnetic energy information, number or character.

The sequence of images may be in the form of a data stream representing a plurality of images in the sequence image sequence, and the combining may include placing the metadata in one location in the data stream to impact the showing of a plurality of images by a single metadata. Alternatively or additionally, the combining may include placing respective metadata in the data stream in relation to respective images represented in the data stream.

As was mentioned above, the objects of interest may be individual objects in a group of objects. For example, the plurality of objects may be a person in a group of persons, an animal in a group of animals, and so on. The object(s) of interest may be a sports object, such as a hockey puck, golf ball, tennis ball, baseball, shuttlecock, or the like. The object(s) of interest may be representation(s) of violence, sex or language, e.g., a shooting, hitting, explosion, language and so on, and/or a pornographic image and/or language. The metadata may be selected by a user so as to highlight one or more respective selected objects of interest in the course of showing images via a display based on a user selected input. As is discussed elsewhere herein, highlight may mean the same as altering or changing the prominence of the object or AOI.

An example of carrying out an embodiment of the invention displaying images is illustrated in the logic diagram 90 of FIG. 14, for example, with reference to steps 94-96. An image signal that includes a primary video signal representing a sequence of images that include a plurality of objects of interest and includes metadata identifying one or more of a plurality of objects of interest in respective images of the sequence of images is received, e.g. at step 94 from step 93. A selecting input may be supplied, e.g., provided, the computer control 12, e.g., at steps 94 and 95, to select one or more of the plurality of objects of interest based on the metadata identifying the selected one or more of the plurality of objects of interest. The metadata is decoded, e.g., see step 42 in FIG. 6 and see FIGS. 3A and 3B, and a user, for example, selects from the metadata the selected one or more of the plurality of objects of interest. Thus, a user input so supplied permits a user of the display system 10 to select the object of interest to be altered in prominence.

The images may be shown on a display with highlighting, e.g., altering of prominence, of the selected one or more of the plurality of objects of interest relative to other portions of respective images in the sequence of images. The showing with highlighting in respective images may be carried out although the number of metadata parts of the image signal is not the same as the number of respective images in the sequence of images (see FIG. 3B); or there may be metadata for each image (see FIG. 3A). The highlighting or altering of prominence of the selected one or more objects of interest is relative to other portions of the displayed image may be, for example, at least one of brightening, darkening, outlining, blurring, blacking out, or the like.

As is illustrated in FIG. 1 and other drawing figures hereof, for example, a system for creating an image signal, e.g., an image signal source 20, such as a camera, CCD or the like configured to obtain a primary video signal representing a sequence of images that include a plurality of objects of interest. The image signal source may be a storage medium, e.g., a CD, DVD, Blu-Ray storage medium, and so on, on which a video signal is stored. A processor system 12 includes hardware and appropriate computer program software or logic code stored in a non-transitory computer readable medium, e.g., a hard drive, electronic storage, or other storage medium, and the processor system is configured to prepare object identification signals to identify one or more of the plurality of the objects of interest. The processor system further is configured to combine the object identification signals as metadata with the primary video signal to form an image signal.

As is illustrated in FIG. 1 and other drawing figures hereof, a display system 10 for displaying images, includes a processor, e.g., the computer control 12 and associated hardware and software, e.g., memory, input/output devices, such as keyboard, remote control, wired control, circuitry, memory, e.g., non-transitory memory (non-transitory computer readable medium), and so on. The computer control 12, e.g., the processor, is configured to receive an image signal that includes a primary video signal representing a sequence of images that include a plurality of objects of interest and includes metadata identifying one or more of a plurality of objects of interest in respective images of the sequence of images. The display system 10 also includes a user input 23, for example, configured to select one or more of the plurality of objects of interest based on the metadata identifying the selected one or more of the plurality of objects of interest. The processor further is configured to effect highlighting of the selected one or more of the plurality of objects of interest. A display 13 responsive to the image signal is configured and operative to show images with highlighting of the selected one or more of the plurality of objects of interest. As was mentioned above, the processor further is configured to decode the metadata and to provide opportunity for a user to effect an input to the processor to select one or more of the plurality of the objects of interest.

In respective embodiments, the objects of interest are at least one of individual objects in a group of objects, a person in a group of persons, an animal in a group of animals, a sports object, such as a hockey puck, golf ball, tennis ball, baseball, shuttlecock, or the like, a pornographic image, or an objectionable image due to sex, violence, language or the like. Also, in an embodiment, the highlighting includes changing prominence of the selected object of interest relative to other portions of the image in which the object of interest is located. In an embodiment, the changing prominence may be at least one of brightening, darkening, outlining, blurring, blacking out, or the like.

Referring to FIG. 1, the logic diagrams hereof and the description above, it will be appreciated that an embodiment of the invention includes logic code stored in a non-transitory computer readable medium, e.g., as is represented at 12m in FIG. 1. The logic code is stored in the non-transitory computer readable medium and includes logic code to form an image signal, the logic code configured for use with a primary video signal representing a sequence of images that include a plurality of objects of interest and for use with object identification signals to identify one or more of the plurality of objects of interest, to carry out the combining of object identification signals as metadata with the primary video signal to form an image signal.

Additionally, referring to FIG. 1, the logic diagrams hereof and the description above, it will be appreciated that an embodiment of the invention includes logic code stored in a non-transitory computer readable medium, e.g., memory 12m in FIG. 1, to control the receiving an image signal that includes a primary video signal representing a sequence of images that include a plurality of objects of interest and includes metadata identifying one or more of a plurality of objects of interest in respective images of the sequence of images, the logic code being responsive to a selecting input to select one or more of the plurality of objects of interest based on the metadata identifying the selected one or more of the plurality of objects of interest. Furthermore, the logic code may cause altering of the prominence of one or more of the plurality of selected objects of interest.

It will be appreciated that features, methods and apparatus illustrated and/or described with respect to any of the several figures and/or embodiments herein may be used with features, methods and apparatus illustrated and/or described with respect to other figures and/or embodiments.

It also will be appreciated that portions of the present invention can be implemented in hardware, software, firmware, or a combination thereof In the described embodiment(s), a number of the steps or methods may be implemented in software or firmware that is stored in a memory and that is executed by a suitable instruction execution system. If implemented in hardware, for example, as in an alternative embodiment, implementation may be with any or a combination of the following technologies, which are all well known in the art: discrete logic circuit(s) having logic gates for implementing logic functions upon data signals, application specific integrated circuit(s) (ASIC) having appropriate combinational logic gates, programmable gate array(s) (PGA), field programmable gate array(s) (FPGA), etc.

Any process or method descriptions or blocks in flow charts may be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

The logic and/or steps represented in the flow diagrams of the drawings, which, for example, may be considered an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

The above description and accompanying drawings depict the various features of the invention. It will be appreciated that the appropriate computer code could be prepared by a person who has ordinary skill in the art to carry out the various steps and procedures described above and illustrated in the drawings. It also will be appreciated that the various terminals, computers, servers, networks and the like described above may be virtually any type and that the computer code may be prepared to carry out the invention using such apparatus in accordance with the disclosure hereof.

Specific embodiments of an invention are disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means".

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

It will be apparent to a person having ordinary skill in the art of computer programming, how to program the display system described herein to operate and carry out logical functions associated with description above. Accordingly, details as to specific programming code have been left out for the sake of brevity. Also, while the functions and may be executed by respective processing devices in accordance with an embodiment, such functionality could also be carried out via dedicated hardware or firmware, or some combination of hardware, firmware and/or software.

Although certain embodiments have been shown and described, it is understood that equivalents and modifications falling within the scope of the appended claims will occur to others who are skilled in the art upon the reading and understanding of this specification.

We claim:

1. A method of displaying images, comprising:
   receiving an encoded image signal that includes a primary video signal representing a sequence of images that include a plurality of objects of interest, and includes metadata identifying one or more of a plurality of objects of interest in respective images of the sequence of images;
   supplying a selecting input to select one or more of the plurality of objects of interest based on the metadata identifying the selected one or more of the plurality of objects of interest; and
   expanding within the image signal during decoding for display, a range of gray levels encoded for the one or more of the plurality of objects of interest based on the metadata, comprising:
      identifying each of the one or more plurality of objects chosen by the selection input;
      identifying the sequence of images containing each of the one or more plurality of objects; and
      distinguishing each of the respective images of the sequence of images, within the image signal, and any image information requiring adjustment by an illuminating light source, and adjusting brightness of the illuminating light source for the one or more of the plurality of objects based on the metadata.

2. The method of claim 1, wherein said supplying a selecting input comprises supplying a user input.

3. The method of claim 1, wherein the selected one or more objects of interest is highlighted to change the prominence thereof relative to other portions of the displayed image.

4. The method of claim 3, wherein changing prominence comprises at least one of brightening, darkening, outlining, blurring, blacking out, or the like.

5. The method of claim 1, further comprising showing the images on a display with highlighting of the selected one or more of the plurality of objects of interest relative to other portions of respective images in the sequence of images.

6. The method of claim 5, said showing with highlighting comprising continuing to show with highlighting in respective images although the number of metadata parts of the image signal is not the same as the number of respective images in the sequence of images.

7. A display system for displaying images, comprising:
   a processor configured to receive an encoded image signal that includes a primary video signal representing a sequence of images that include a plurality of objects of interest, and includes metadata identifying one or more of a plurality of objects of interest in respective images of the sequence of images,
   a user input configured to select one or more of the plurality of objects of interest based on the metadata identifying the selected one or more of the plurality of objects of interest, the processor further configured to effect highlighting of the selected one or more of the plurality of objects of interest; and a display responsive to the image signal to show images with highlighting of the selected one or more of the plurality of objects of interest;

wherein the metadata includes information for expanding within the image signal during decoding for display, a range of gray levels encoded for the one or more of the plurality of objects of interest based on the metadata, comprising:

an identity of each of the one or more plurality of objects chosen by the selection input;

an identity of the sequence of images containing each of the one or more plurality of objects; and a selection of each of the respective images of the sequence of images, within the image signal, and any image information requiring adjustment by an illuminating light source, and for adjusting brightness of the illuminating light source for the one or more of the plurality of objects.

8. The system of claim 7, the processor further configured to decode the metadata and to provide opportunity for a user to effect an input to the processor to select one or more of the plurality of the objects of interest.

9. The system of claim 8, wherein the objects of interest are at least one of individual objects in a group of objects, a person in a group of persons, an animal in a group of animals, a sports object, such as a hockey puck, golf ball, tennis ball, baseball, shuttlecock, or the like, a pornographic image, or an objectionable image due to sex, violence, language or the like.

10. The system of claim 8, wherein highlighting comprises changing prominence of the selected object of interest relative to other portions of the image in which the object of interest is located.

11. The system of claim 10 wherein changing prominence comprises at least one of brightening, darkening, outlining, blurring, blacking out, or the like.

12. Logic code stored in a non-transitory computer readable medium, comprising:

logic code controlling the receiving an encoded image signal that includes a primary video signal representing a sequence of images that include a plurality of objects of interest, and includes metadata identifying one or more of a plurality of objects of interest in respective images of the sequence of images; and logic code responsive to a selecting input to select one or more of the plurality of objects of interest based on the metadata identifying the selected one or more of the plurality of objects of interest;

wherein the metadata includes information for expanding within the image signal during decoding for display, a range of gray levels encoded for the one or more of the plurality of objects of interest based on the metadata, comprising:

an identity of each of the one or more plurality of objects chosen by the selection input;

an identity of the sequence of images containing each of the one or more plurality of objects; and a selection of each of the respective images of the sequence of images, within the image signal, and any image information requiring adjustment by an illuminating light source, and for adjusting brightness of the illuminating light source for the one or more of the plurality of objects.

13. The logic code of claim 12, further comprising logic code to alter the prominence of one or more of the plurality of selected objects of interest.

* * * * *